United States Patent
Froitzheim

(10) Patent No.: US 11,390,247 B2
(45) Date of Patent: Jul. 19, 2022

(54) MOTOR VEHICLE ENTRY AND/OR STARTING SYSTEM

(71) Applicant: Continental Automotive GmbH, Hannover (DE)

(72) Inventor: Herbert Froitzheim, Pettendorf (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/074,748

(22) PCT Filed: Jan. 26, 2017

(86) PCT No.: PCT/EP2017/051698
§ 371 (c)(1),
(2) Date: Aug. 1, 2018

(87) PCT Pub. No.: WO2017/133963
PCT Pub. Date: Aug. 10, 2017

(65) Prior Publication Data
US 2019/0039568 A1    Feb. 7, 2019

(30) Foreign Application Priority Data

Feb. 3, 2016  (DE) .................... 10 2016 201 601.6

(51) Int. Cl.
*B60R 25/24*  (2013.01)
*G07C 9/00*   (2020.01)
(Continued)

(52) U.S. Cl.
CPC ............ *B60R 25/24* (2013.01); *B60R 25/209* (2013.01); *G06N 20/00* (2019.01); *G07B 15/00* (2013.01);
(Continued)

(58) Field of Classification Search
None
See application file for complete search history.

(56) References Cited

U.S. PATENT DOCUMENTS 8,841,987 B1   9/2014   Stanfield et al. ............ 340/5.61
8,880,239 B2  11/2014   Kleve et al. ..................... 701/2
(Continued)

FOREIGN PATENT DOCUMENTS

CN   101868810 A   10/2010   ............... G07C 9/00
CN   201685789 U   12/2010   ............. B60R 25/20
(Continued)

OTHER PUBLICATIONS

Chinese Office Action, Application No. 201780009795.4, 15 pages, dated May 26, 2020.
(Continued)

*Primary Examiner* — Adolf Dsouza
(74) *Attorney, Agent, or Firm* — Slayden Grubert Beard PLLC

(57) ABSTRACT

Some embodiments may include an apparatus comprising: a first universal key for unlocking, locking, and/or starting a motor vehicle; a server; and a mobile radio terminal. The first universal key is trained to a particular motor vehicle using a first secret. The server stores a further secret for unlocking, locking, and/or starting the motor vehicle. The server is configured to transmit the further secret to a universal key using two interfaces and the mobile radio terminal.

17 Claims, 2 Drawing Sheets

(51) Int. Cl.
  *G07B 15/00* (2011.01)
  *G06N 20/00* (2019.01)
  *B60R 25/20* (2013.01)

(52) U.S. Cl.
  CPC ..... *G07C 9/00309* (2013.01); *G07C 9/00571* (2013.01); *G07C 9/00857* (2013.01); *B60R 2325/101* (2013.01); *G07C 2009/00341* (2013.01); *G07C 2009/00523* (2013.01); *G07C 2009/00547* (2013.01); *G07C 2009/00793* (2013.01); *G07C 2009/00841* (2013.01); *G07C 2009/00865* (2013.01); *G07C 2209/08* (2013.01)

(56) References Cited

U.S. PATENT DOCUMENTS

| | | | |
|---|---|---|---|
| 8,884,740 B2 | 11/2014 | Kuebler et al. | 340/5.72 |
| 2005/0099265 A1 | 5/2005 | Dix et al. | 340/5.72 |
| 2007/0296545 A1 | 12/2007 | Clare | 340/5.64 |
| 2013/0259232 A1* | 10/2013 | Petel | H04L 63/0492 380/270 |
| 2019/0088036 A1 | 3/2019 | Van Wiemeersch et al. | |

FOREIGN PATENT DOCUMENTS

| | | | | |
|---|---|---|---|---|
| CN | 103502065 A | 1/2014 | | B60R 25/24 |
| CN | 103810629 A | 5/2014 | | G06Q 20/40 |
| CN | 103813262 A | 5/2014 | | B60R 25/00 |
| CN | 103886657 A | 6/2014 | | G07C 9/00 |
| CN | 204178432 U | 2/2015 | | G07C 9/00 |
| DE | 19753401 A1 | 6/1999 | | B60R 25/04 |
| DE | 102009035654 A1 | 2/2011 | | B60R 25/00 |
| DE | 102011107554 A1 | 1/2013 | | B60R 25/00 |
| DE | 102013105022 A1 | 11/2014 | | B60R 16/02 |
| EP | 1705083 A1 | 9/2006 | | B60R 25/00 |
| EP | 2716510 A1 | 4/2014 | | B60R 25/20 |
| EP | 2743868 A1 | 6/2014 | | G06Q 10/02 |
| WO | 2017/133963 A1 | 8/2017 | | B60R 25/00 |

OTHER PUBLICATIONS

Chinese Office Action, Application No. 201780009795.4, 6 pages, dated Jan. 22, 2021.
European Office Action, Application No. 17702816.4, 8 pages, dated Dec. 2, 2021.
German Office Action, Application No. 102016201601.6, 7 pages, dated Jun. 16, 2016.
International Search Report and Written Opinion, Application No. PCT/EP2017/051698, 27 pages, dated May 10, 2017.
CN 103502065 A, U.S. Pat. No. 8,884,740 B2.

* cited by examiner

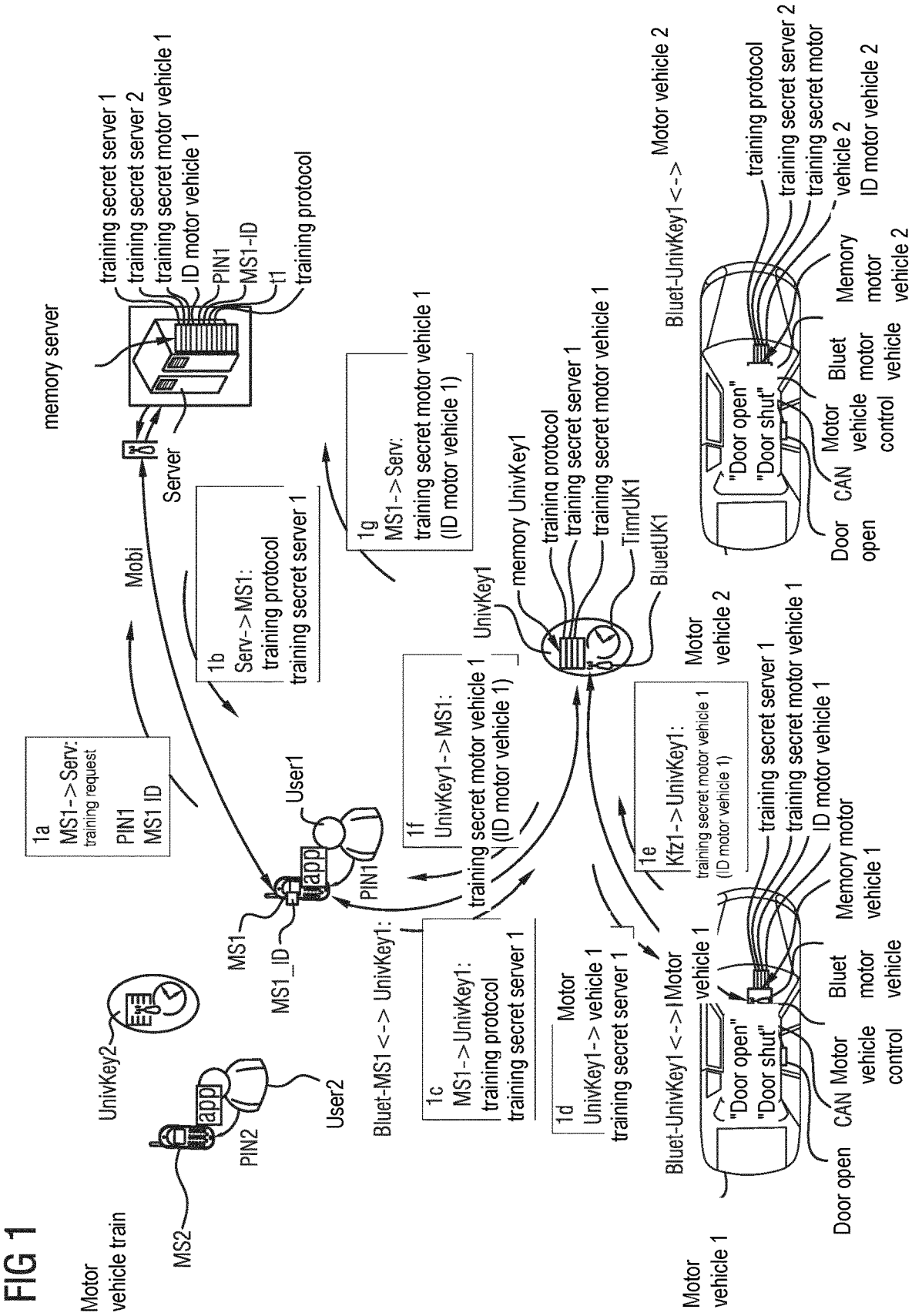

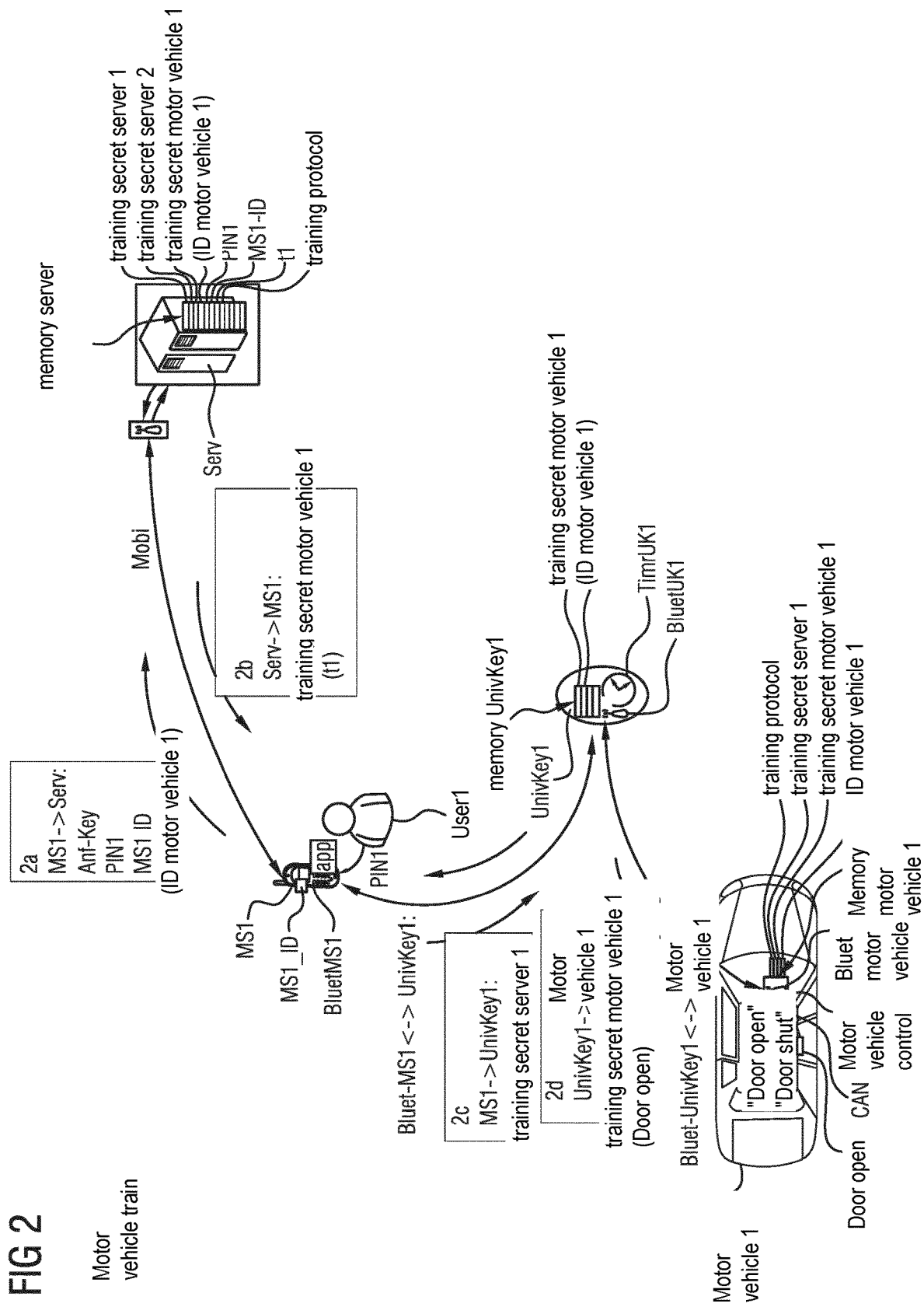

MOTOR VEHICLE ENTRY AND/OR STARTING SYSTEM

CROSS-REFERENCE TO RELATED APPLICATIONS

This application is a U.S. National Stage Application of International Application No. PCT/EP2017/051698 filed Jan. 26, 2017, which designates the United States of America, and claims priority to DE Application No. 10 2016 201 601.6 filed Feb. 3, 2016, the contents of which are hereby incorporated by reference in their entirety.

TECHNICAL FIELD

The invention relates to methods and apparatuses for unlocking a motor vehicle using an engine start and/or vehicle entry system.

SUMMARY

The teachings of the present disclosure may be employed to optimize an engine start and/or vehicle entry system for motor vehicles. For example, some embodiments may include an apparatus (motor vehicle train), in particular having a motor vehicle entry and/or starting system, having at least one universal key (Univ-Key1) for unlocking (motor vehicle control, Door open) and/or locking (motor vehicle control, Door open) and/or starting (MotStart) at least one motor vehicle (motor vehicle 1), having a server (Serv), and having a mobile radio terminal (Mob1), wherein at least after the motor vehicle key (UnivKey1) is trained (1a-1g) to a motor vehicle (motor vehicle 1) using a first secret (training secret server 1), a further secret (training secret motor vehicle 1) for unlocking (motor vehicle control, Door open) and/or locking (motor vehicle control, Door open) and/or starting the motor vehicle (motor vehicle 1) is stored in a server (Serv) (memory server, memory motor vehicle 1), and wherein the further secret (training secret motor vehicle 1) is transmittable (2a-2c) from the server (Serv) to a universal key (Univ-Key1) using two interfaces (Mobi, Bluet-MS1↔UnivKey1) and the mobile radio terminal (Mob1).

In some embodiments, the apparatus has a control device (motor vehicle control) for comparing and/or checking a further secret (training secret motor vehicle 1), received in the motor vehicle (motor vehicle 1) from a universal key (Univ-Key1), with a further secret (training secret motor vehicle 1) stored (motor vehicle) in the motor vehicle (motor vehicle 1), wherein the control device (motor vehicle control) is configured so as, only if the two further secrets (training secret motor vehicle 1) match and/or are concordant, to allow and/or prompt (CAN, Door open, MotStart) unlocking (motor vehicle control, Door open) and/or locking (motor vehicle control, Door open) and/or starting (MotStart) of the motor vehicle (motor vehicle 1).

In some embodiments, the apparatus (motor vehicle train) has at least one universal key (Univ-Key1) that has a respective radio interface, in particular a Bluetooth interface (BluetUK1), in order to communicate with a mobile radio terminal and/or with a motor vehicle (motor vehicle 1, Bluet motor vehicle).

In some embodiments, the apparatus (motor vehicle train) has at least one universal key (Univ-Key1) that has a respective timer (TimrUK1) and the (Univ-Key1) is configured to use the timer (TimrUK1) to monitor a temporal validity (t1), prescribed for said timer, of a further secret (training secret motor vehicle 1), communicated (2c) to said timer, for (2d) opening or closing or starting a motor vehicle (motor vehicle 1).

In some embodiments, the apparatus comprises more than one (Univ-Key1, Univ-Key2) or more than ten or more than fifty universal keys, and/or comprises more than one (Univ-Key1, Univ-Key2) or more than ten or more than fifty first secrets (training secret server 1) and/or further secrets (training secret motor vehicle 1).

As another example, some embodiments include a method in which, in particular using an apparatus (motor vehicle train) as described above, a universal key (Univ-Key1) receives (1a-1c) a first secret (training secret server 1) from a server (Serv), and a further secret (training secret motor vehicle 1) for unlocking (motor vehicle control, Door open) and/or locking (motor vehicle control, Door open) and/or starting (MotStart) a motor vehicle (motor vehicle 1) is transmitted (1e) from the motor vehicle (motor vehicle 1) to the universal key (Univ-Key1) and is transmitted (1f-1g) to the server (Serv), and is stored (memory server) in the server (Serv).

In some embodiments, first of all a first secret (training secret server 1) is transmitted (1a-1d) between a server (Serv) and a universal key (Univ-Key1) and/or between a universal key (Univ-Key1) and a motor vehicle (motor vehicle 1), and thereafter a further secret (training secret motor vehicle 1) is transmitted from a motor vehicle (motor vehicle 1) to a server (Serv) using a universal key (Univ-Key1) and a further device, in particular in the form of a mobile radio terminal (MS1).

In some embodiments, a server (Serv) uses three interfaces (Mobi, Bluet-MS1↔UnivKey1, BluetUnivKey1↔motor vehicle 1) and uses a universal key (Univ-Key1) to transmit a first secret (training secret server 1) to a motor vehicle (motor vehicle 1), and the motor vehicle (motor vehicle 1) uses three interfaces (Mobi, Bluet-MS1↔UnivKey1, BluetUnivKey1↔motor vehicle 1) and uses a universal key (Univ-Key1) to transmit a further secret (training secret motor vehicle 1) to a server (Serv), wherein the three interfaces (Mobi, Bluet-MS1↔UnivKey1, BluetUnivKey1↔motor vehicle 1) are in particular radio interfaces, in particular mobile radio interfaces (Mobi) and/or Bluetooth radio interfaces (Bluet-MS1↔UnivKey1, BluetUnivKey1↔motor vehicle 1).

In some embodiments for implementing a further secret (training secret motor vehicle 1), usable (2d) for (2d) opening (motor vehicle control, Door open) and/or closing (motor vehicle control, Door open) and/or starting (MotStart) a motor vehicle (motor vehicle 1), in a universal key (Univ-Key1), wherein the further secret (training secret motor vehicle 1) is transmitted from a server (Serv) to the universal key (Univ-Key1) using two interfaces (Mobi, Bluet-MS1↔UnivKey1), in particular using two interfaces that (Mobi, Bluet-MS1↔UnivKey1) are radio interfaces.

In some embodiments, one of the two interfaces (Mobi, Bluet-MS1↔UnivKey1) is a mobile radio interface (Mobi) and/or one of the two interfaces (Mobi, Bluet-MS1↔UnivKey1) is a Bluetooth radio interface (Bluet-MS1↔UnivKey1).

In some embodiments, multiple further secrets (training secret motor vehicle 1, training secret motor vehicle 2) that are each usable for (2d) opening and/or closing and/or starting a respective motor vehicle (motor vehicle 1, motor vehicle 3) are transmitted (2d, 2y) to a universal key (Univ-Key1).

In some embodiments, a further secret (training secret motor vehicle 1, training secret motor vehicle 2) usable (2d)

for only some of the functions (2d) "opening and/or closing and/or starting a respective motor vehicle (motor vehicle 1, motor vehicle 3)" is transmitted (2a-2c) to a universal key (Univ-Key1).

In some embodiments, at least one universal key (UnivKey1) respectively stores (memory UnivKey1) multiple protocols (training protocols) and/or multiple further secrets (training secret motor vehicle 1, training secret motor vehicle 2) for one or more motor vehicles (motor vehicle 1, motor vehicle 2) at the same time.

In some embodiments, multiple universal keys (UnivKey1, UnivKey2) are trained (1a-1g) and/or stored (memory server, memory motor vehicle 1, 2a-2d) for a motor vehicle (motor vehicle 1) at the same time, in particular in order to allow multiple users (user 1, user 2) to operate (MotStart) and/or enter (Door open) and/or close (Door open, Door shut) at the same time.

In some embodiments, the method is employed in an apparatus (motor vehicle train) that comprises more than one (Univ-Key1, Univ-Key2) or more than ten or more than fifty universal keys and/or comprises (memory server) more than one (Univ-Key1, Univ-Key2) or more than ten or more than fifty first secrets (training secret server 1) and/or further secrets (training secret motor vehicle 1).

BRIEF DESCRIPTION OF THE DRAWINGS

Further features and advantages of some embodiments of the teachings herein emerge from the following description of examples with reference to the drawing, in which, to illustrate some possible configurations of the invention, in each case in simplified schematic form, by way of example, FIG. 1 shows an overview of a communication between server, mobile radio terminal, motor vehicle key, and motor vehicle controller, specifically e.g. by mobile radio, Bluetooth and if need be further interface(s), when training a universal key to a motor vehicle using a first secret, to generate a virtual (motor vehicle) key in the form of a further secret in the motor vehicle and server, FIG. 2 shows an overview of a communication between server, mobile radio terminal, motor vehicle key, motor vehicle controller, door opener, engine, by mobile radio, Bluetooth and if need be further interface(s), when using a virtual key in the form of a further secret in a universal key for starting or opening or closing, etc., a motor vehicle.

DETAILED DESCRIPTION

Various configurations of the teachings herein allow safe, universal implementation of at least one virtual key in a respective universal key for an engine start and/or vehicle entry system for motor vehicles that is suitable in particular for a plurality of virtual keys (in the form of (further) secrets) and/or universal keys and/or vehicles and/or users, such as e.g. in a vehicle fleet or rental car fleet. Some embodiments may be implemented as an apparatus in an engine start and/or vehicle entry system of a motor vehicle and/or (for e.g. transmitters/receivers) in particular in a motor vehicle key configured as a universal key (e.g. in the form of a mechanical key or radio key or a card, etc.) and/or a mobile radio terminal and/or a server and/or a controller of a respective motor vehicle.

In some embodiments, a universal key can respectively manage multiple protocols and/or multiple virtual keys in the form of (further) secrets, etc., at the same time. In a further configuration, multiple universal keys per vehicle can be trained and managed at the same time, e.g. in order to allow multiple users to operate and/or enter at the same time. In a further configuration, a universal key can manage limited rights, such as e.g. only vehicle entry, only entry without trunk entry, only trunk entry, etc. In a further configuration, a virtual key is trained directly to vehicles or other entry authorisations on a server and an ordinary training process is dispensed with.

By also providing a user with a universal key that can connect both to (most) vehicles and, using his mobile radio terminal such as e.g. a smartphone (or directly), to a server Serv and that moreover can simulate virtual keys and can assign them an expiry time, it may be possible for some or multiple or all further additional electronics of a motor vehicle to be dispensed with that would also for the most part still be implemented specifically for vehicle series. Various embodiments allow a motor vehicle not to be changed or to be changed little, or the security mechanisms of a motor vehicle to be made unbypassable or difficult to bypass. In the broadest sense, convenience functions for vehicle entry and starting can be retained (e.g. entry by radio, passive entry, etc.). It is also possible for universal keys and/or virtual keys (in the form of secrets) having a limited scope of functions (e.g. only opening and closing) to be issued.

FIG. 1 shows, for an exemplary embodiment, an overview of some components of a motor vehicle entry and/or starting system motor vehicle train and a multipartite (1a-1g) communication (in the case of key training) between a server Serv, a mobile radio terminal MS1 (of a user 1), one of multiple vehicle keys in the form of universal keys Univkey1, Univ-key2 for (in each case at least) one motor vehicle 1 or 2 and a motor vehicle controller of a motor vehicle 1, specifically in this case a respective communication via radio links by, in particular, mobile radio Mob and/or Bluetooth link(s) Bluet, Bluet-MS1↔UnivKey1, BluetUnivKey1↔motor vehicle 1 and/or further vehicle-internal (radio/line, etc.) interface(s) such as e.g. a wired vehicle bus CAN.

FIG. 1 shows (if need be even more than two or more than ten or more than one hundred) virtual vehicle keys (each in the form of a further secret such as training secret motor vehicle 1) that are generated (e.g. as a one-off) and are stored in an indicated memory server of a server Serv, two (of if need be multiple, if need be even more than two or more than ten or more than one hundred) vehicle keys in the form of universal keys UnivKey1, UnivKey2, and a motor vehicle 1, one of the universal keys UnivKey1 being trained (1a-1g) to at least one (e.g. any) respective motor vehicle 1, and from then being able to be authorized (2a-2d) for the latter (motor vehicle 1) for opening (Door open) and/or closing (Door open) and/or starting (MotStart), e.g. for a vehicle fleet such as e.g. a rental car fleet, etc.

A universal key UnivKey1 and/or UnivKey2 in this case has a respective radio interface BluetUK1 (e.g. a Bluetooth interface having e.g. a Bluetooth antenna) by means of which it can communicate e.g. with a radio interface (e.g. likewise a Bluetooth interface having e.g. a Bluetooth antenna) BluetMS1 of a mobile radio terminal MS1, and by means of which it can communicate e.g. with a radio interface (e.g. likewise a Bluetooth interface having e.g. a Bluetooth antenna) Bluet motor vehicle (e.g. likewise a Bluetooth interface) of a motor vehicle 1.

A mobile radio terminal MS1 (from if need be multiple mobile radio terminals) in this case has a radio interface BluetMS1, indicated in the drawing, by means of which it can communicate e.g. with a radio interface BluetUK1 (e.g. a Bluetooth interface) of a universal key Univkey1, and a mobile radio interface Mobi (such as e.g. for a 2G/3G/3.5 G and/or 4G mobile radio network/WLAN, etc.) by means of which it can communicate with a server Serv (using e.g. a mobile radio network connection indicated by two arrows) via (at least) a mobile radio network Mobi.

In FIG. 1 a mobile radio terminal MS1 (such as e.g. a cell phone, tablet, computer, etc.) uses a mobile radio interface Mobi (such as e.g. 2G, 3G, 3.5 G, 4G, WLAN, etc.) to transmit, e.g. under the control of a piece of software or an application app, as first step 1a in this case, e.g. a statement MS1-ID identifying the mobile radio terminal MS1 (such as e.g. an MSISDN or other identifier, etc.) and/or e.g. a statement PIN1 identifying the user 1 of the mobile radio terminal MS1 (such as e.g. an input previously entered by the user 1 on the mobile radio terminal by keypad/voice, etc.) and/or a training request (request for a training protocol and/or for a training secret server 1) to a server Serv connected to the mobile radio network Mobi, which (Serv) stores e.g. in this case the statement MS1-ID identifying the mobile radio terminal MS1 (such as e.g. an MSISDN, etc.) and/or the statement PIN1 identifying the user 1 of the mobile radio terminal MS1 (e.g. in association with one another/linked to one another) in an indicated memory server.

In step 1b in FIG. 1, the server Serv transmits a first secret (in this case a training secret used for training) (training secret server 1) and possibly also a training protocol to the mobile radio terminal MS1 via the network Mobi (and stores, e.g. in said mobile radio terminal, that this training secret server 1 is now part of and/or associated with the statement MS1-ID identifying a mobile radio terminal MS1 and/or the statement PIN1 identifying the user 1 of the mobile radio terminal MS1).

In step 1c in FIG. 1, the mobile radio terminal MS1 uses an (e.g. Bluetooth) interface Bluet-MS1↔UnivKey1 to transmit to the universal key UnivKey1 the first secret (training secret) (training secret server 1) and possibly also a training protocol, which the universal key UnivKey1 stores in an indicated memory UnivKey1.

In step 1d in FIG. 1, the universal key UnivKey1 uses an (e.g. Bluetooth) interface Bluet-UnivKey1↔motor vehicle 1 to transmit to a radio interface Bluet motor vehicle 1 of the motor vehicle 1 the first secret (training secret) training secret server 1 and possibly if need be also the training protocol, which the motor vehicle 1 stores in an indicated memory motor vehicle 1. For (Bluetooth, etc.) authentication on a (radio) interface BluetUnivKey1↔motor vehicle, e.g. a secret (such as e.g. in this case training secret server 1 or another) known to the motor vehicle 1 and to the universal key UnivKey1 can be used.

In step 1e in FIG. 1, the motor vehicle 1 uses an (e.g. Bluetooth) interface Bluet-UnivKey1↔motor vehicle 1 to transmit to the universal key UnivKey1 a further secret (training secret motor vehicle 1) (generated and/or stored in the motor vehicle 1), which the universal key UnivKey1 stores (in this case only temporarily) in an indicated memory (memory UnivKey1, and that can be used e.g. in future as a virtual key for a universal key (e.g. UnivKey1) to open/close/start, etc., the motor vehicle 1.

In step if in FIG. 1, the universal key UnivKey1 uses an (e.g. Bluetooth) interface Bluet-MS1↔UnivKey1 to transmit to the mobile radio terminal MS1 the further secret (training secret motor vehicle 1), which the mobile radio terminal MS1 stores in an indicated memory (memory MS1). (If need be, the universal key UnivKey1 then possibly erases the further secret (training secret motor vehicle 1).)

In step 1g in FIG. 1, the mobile radio terminal MS1 uses an (e.g. mobile radio) interface Mobi to transmit to the server Serv the further secret (training secret motor vehicle 1), which the server Serv stores in an indicated memory (memory server). If need be, an identity statement ID motor vehicle 1 relating to the motor vehicle 1 can also be transmitted with a further secret (training secret motor vehicle 1) from the motor vehicle 1 to the universal key UnivKey1 and/or to the mobile radio terminal MS1 and/or to the server Serv and/or stored (in the universal key UnivKey1 and/or mobile radio terminal MS1 and/or server Serv), so that later, in the event of a request (2a) (if need be inter alia) providing an identity statement ID motor vehicle 1 for a motor vehicle 1 in the universal key UnivKey1 and/or mobile radio terminal MS1 and/or, in particular, server Serv, a further secret (training secret motor vehicle 1) stored therein for this identity statement ID motor vehicle 1 for a motor vehicle 1 can be identified and transmitted (to a universal key UnivKey1 and/or mobile radio terminal MS1 and/or motor vehicle 1 for motor vehicle opening and/or closure and/or starting, etc.).

In the universal key UnivKey1 and/or mobile radio terminal MS1, it is possible e.g. for the stored further secret (training secret motor vehicle 1) (obtained there during training and/or later) to be erased automatically e.g. immediately or after a prescribed time (e.g. controlled using a timer TimUK1 in the universal key UnivKey 1 and/or a timer in the mobile radio terminal MS1 and/or Kfz1 and/or server Serv, etc.). Such a training process for training the universal key UnivKey1 to the motor vehicle 1 can take place using this same (UnivKey1) or a (or multiple) different (UnivKey2) universal key for multiple motor vehicles (not depicted) 2, etc., for example, e.g. even for a vehicle fleet. Thus, one or more motor vehicles1, 2, etc., is or are (after erasure in the universal key used for training 1a-1f) (now only) trained to one server Serv, that is to say startable and/or openable and/or closable and/or closable only at the trunk, etc., using a further secret (training secret motor vehicle 1) stored (e.g. only) there (Serv).

It is now thus possible, as FIG. 2 shows, for any of the universal keys Univkey1, UnivKey2 to be authorized (e.g. also by any user 1, 2) by the server Serv (by means of e.g. (radio) transmission of a further secret (training secret motor vehicle 1), respectively stored for a motor vehicle 1 (e.g. with the identity ID motor vehicle 1 thereof) and/or mobile radio terminal and/or user 1 and/or code Pin1, to the universal key) to start and/or open and/or close and/or close only at the trunk, etc., one (motor vehicle 1) or more of the motor vehicles using a further secret (training secret motor vehicle 1).

FIG. 2 shows authorization of a universal key UnivKey1 by a server Serv to allow this universal key UnivKey1, following this authorization, to start and/or open and/or close and/or close only at the trunk, etc., a motor vehicle 1 using a further secret (training secret motor vehicle 1), which is stored in the server Serv (and e.g. findable for said motor vehicle in the form of the identity ID motor vehicle 1 thereof, etc.).

In FIG. 2 a mobile radio terminal MS1 (such as e.g. a cell phone, tablet, computer, etc.) uses a mobile radio interface Mobi (such as e.g. 2G, 3G, 3.5 G, 4G, etc.) to transmit, e.g. under the control of a piece of software or an application app, as first step 2a in this case, a statement MS1-ID identifying the mobile radio terminal MS1 (such as e.g. an MSISDN, etc.) and/or a statement PIN1 identifying the user 1 of the mobile radio terminal MS1 (such as e.g. an input previously entered by the user 1 on the mobile radio terminal by keypad/voice, etc.) and/or a statement ID motor vehicle 1 identifying the motor vehicle 1 and/or a request Key (for a further secret (training secret server 1) as a virtual key for opening/closing/starting/etc. a particular motor vehicle 1) to a server Serv connected to the mobile radio network Mobi.

The server Serv if need be checks the statement MS1-ID identifying the mobile radio terminal MS1 (such as e.g. an MSISDN, etc.) and/or the statement PIN1 identifying the user 1 of the mobile radio terminal MS1 and/or the statement ID motor vehicle 1 identifying the motor vehicle 1 on the basis of values stored in an indicated memory (memory server) and/or identifies, e.g. after a successful check (e.g. on the basis of the obtained MS1-ID and/or user 1 and/or ID motor vehicle 1), the further secret (training secret server 1) for opening/closing/starting, etc., a particular motor vehicle1 in its memory (memory server).

In step 2b in FIG. 2, the server Serv transmits an identified (e.g. on the basis of the obtained MS1-ID and/or user 1 and/or ID motor vehicle 1) further secret (training secret motor vehicle 1) for opening, etc., a particular motor vehicle 1 to the mobile radio terminal MS1 (requesting it), e.g. via a mobile radio interface Mobi. In step 2c in FIG. 2, the mobile radio terminal MS1 uses an (e.g. Bluetooth) interface Bluet-MS1↔UnivKey1 to transmit to the universal key UnivKey1 (e.g. currently connected to the mobile radio terminal by Bluetooth) the further secret (training secret motor vehicle 1) (for the motor vehicle 1), which the universal key UnivKey1 stores in an indicated memory (memory UnivKey1) (e.g. only for a time t1 prescribed therefor).

In step 2d in FIG. 2, the universal key UnivKey1 uses an (e.g. Bluetooth) interface Bluet-UnivKey1↔motor vehicle 1 to transmit (e.g. for the purpose of opening or closing or starting, etc.) to a radio interface Bluet motor vehicle of the motor vehicle 1 the further secret (training secret motor vehicle 1), which the motor vehicle 1 compares and/or checks if need be e.g. on the basis of a further secret (training secret motor vehicle 1) stored in an indicated memory (memory motor vehicle 1), whereupon a door opener (Door open) Türöff or starter MotStart, etc., of the motor vehicle 1 is then operated (to open or close or start, etc.) by a motor vehicle controller (depending on what the universal key calls for, such as e.g. Door open to open) via an (CAN, etc.) interface CAN e.g. in the event of a match. The further secret (training secret motor vehicle 1) can thus be used (in each case) as a virtual key for (e.g. just precisely) one motor vehicle 1.

The length of time for which a further secret (training secret motor vehicle 1) is supposed to authorize (e.g. precisely) one universal key UnivKey1 to use e.g. an interface Bluet-UnivKey1↔motor vehicle 1 (e.g. Bluetooth or other radio interface such as e.g. PACE, RKE etc.) to prompt a motor vehicle 1 to open or close or start, etc., may be limited, e.g. by virtue of (e.g. in step 2b and/or 2c) a time statement t1 being sent to a universal key UnivKey1 with the further secret (training secret motor vehicle 1), said time statement being e.g. continually compared, e.g. in the universal key UnivKey1 and/or motor vehicle 1, with a timer TimrUK1, the universal key UnivKey1 being prepared to prompt a motor vehicle 1 to open or close or start, etc., only up to expiry of the time, and then no longer. The further secret (training secret motor vehicle 1) can be erased automatically in the universal key e.g. in the event of a detected manipulation attempt such as stopping the timer TimerUKl (e.g. even if said timer is monitored by means of the server and/or mobile radio terminal).

One or more or all transmissions (e.g. 1a-1g, 2a-2d, etc.) of data can take place in particular in cryptographically protected fashion. In some embodiments, a universal key UnivKey1 can respectively manage multiple protocols (training protocols) and/or (further) secrets (training secret motor vehicle 1, training secret motor vehicle 2) etc. at the same time. In a further configuration, multiple universal keys UnivKey1, UnivKey2 per vehicle can be trained and managed at the same time, e.g. in order to allow multiple users Ben1, Ben2 to operate and/or enter at the same time. In a further configuration, a universal key can manage limited rights, such as e.g. only vehicle entry, only entry without trunk entry, only trunk entry, etc. In a further configuration, a virtual key such as training secret motor vehicle 1, training secret motor vehicle 2 is trained directly to vehicles or other entry authorizations on the server Serv and the ordinary training process can be dispensed with.

By letting a user 1 have a universal key UnivKey1 that can connect both to (most) vehicles 1, 2 and, using his mobile radio terminal such as e.g. a smartphone (or directly), to a server Serv and that moreover can simulate virtual keys (such as training secret motor vehicle 1, training secret motor vehicle 2) and can assign them an expiry time (t1), it may be possible for some or multiple or all further additional electronics to be dispensed with that would also for the most part otherwise still be implemented specifically for vehicle series.

Some embodiments allow a vehicle not to be changed or to be changed little, or security mechanisms of a vehicle to be made unbypassable or difficult to bypass. In the broadest sense, convenience functions for vehicle entry and/or starting can be retained (e.g. entry by radio, passive entry and passive go). It is also possible for universal keys and/or further secrets having a limited scope of functions (e.g. only opening and/or closing) to be issued.

What is claimed is:

1. A method comprising:
   receiving a first secret from a server at a universal key, wherein the first secret includes a first associated scope of authorization for the use of the motor vehicle;
   transmitting a further secret for at least one of unlocking, locking, and/or starting a motor vehicle from the motor vehicle to the universal key, wherein the further secret includes a further associated scope of authorization for the use of the motor vehicle;
   transmitting the further secret from the universal key to the server,
   wherein the universal key cannot perform the at least one of unlocking, locking, and/or starting the motor vehicle using the first associated scope of authorization and a scope of authorization of the universal key is adapted to the further associated scope of authorization based on the further secret once received; and
   storing the further secret in the server.

2. The method as claimed in claim 1, further comprising:
   transmitting the first secret from a server to the universal key; and
   thereafter transmitting a further secret from the motor vehicle to a server using the universal key and an associated mobile radio terminal.

3. The method as claimed in claim 1, wherein the server uses three interfaces and the universal key to transmit the first secret to the motor vehicle;
   the motor vehicle uses three interfaces and the universal key to transmit the further secret to the server; and the three interfaces comprise radio interfaces.

4. The method as claimed in claim 1, further comprising transmitting a further secret from a server to the universal key using two interfaces comprising radio interfaces.

5. The method as claimed in claim 4, wherein at least one of the two interfaces comprises a mobile radio interface or at least one of the two interfaces comprises a Bluetooth radio interface.

6. The method as claimed in claim 4, wherein multiple further secrets are each usable for opening, closing, and/or starting a respective motor vehicle;
further comprising transmitting the multiple further secrets to the universal key.

7. The method as claimed in claim 4, further comprising transmitting a further secret usable for only some of the functions to the universal key.

8. The method as claimed in claim 4, further comprising storing multiple protocols or multiple further secrets in the universal key for one or more motor vehicles at the same time.

9. The method as claimed in claim 4, further comprising training multiple universal keys for the motor vehicle at the same time to allow multiple users to operate, enter, and/or close at the same time.

10. The method as claimed in claim 4, further comprising training more than one universal key.

11. The method as claimed in claim 4, further comprising using more than one first secrets and/or further secrets.

12. An apparatus comprising:
a first universal key for unlocking, locking, and/or starting a motor vehicle;
a server; and
a mobile radio terminal;
wherein the first universal key is trained to a particular motor vehicle using a first secret, wherein the first secret includes a first associated scope of authorization for the use of the motor vehicle;
the server stores a further secret for at least one of unlocking, locking, and/or starting the motor vehicle, wherein the further secret includes a further associated scope of authorization for the use of the motor vehicle and the further associated scope of authorization is different from the first associated scope of authorization; and
the server is configured to transmit the further secret to the first universal key using two interfaces and the mobile radio terminal,
wherein the first universal key cannot perform the at least one of unlocking, locking, and/or starting the motor vehicle using the first associated scope of authorization and a scope of authorization of the first universal key is adapted to the further associated scope of authorization based on the further secret once received.

13. The apparatus as claimed in claim 12, further comprising a controller for checking the further secret received from any universal key against a further secret stored in the motor vehicle;
wherein the control device is programmed, only if the two further secrets match, to allow and/or prompt unlocking, locking, and/or starting the motor vehicle.

14. The apparatus as claimed in claim 12, wherein the first universal key comprises a respective radio interface to communicate with the mobile radio terminal and/or with the motor vehicle.

15. The apparatus as claimed in claim 12, wherein the universal key includes a timer to monitor a temporal validity, predefined for said timer, of a further secret communicated to said timer, for opening, or closing, or starting the motor vehicle.

16. The apparatus as claimed in claim 12, further comprising more than one universal key.

17. The apparatus as claimed in claim 12, further comprising more than one first secrets and/or further secrets.

* * * * *